United States Patent [19]

Hock

[11] Patent Number: 5,398,966
[45] Date of Patent: Mar. 21, 1995

[54] DUAL STAGE INFLATOR

[75] Inventor: Christopher Hock, Uintah, Utah

[73] Assignee: Morton International, Inc., Chicago, Ill.

[21] Appl. No.: 264,118

[22] Filed: Jun. 22, 1994

Related U.S. Application Data

[62] Division of Ser. No. 25,505, Mar. 3, 1993, Pat. No. 5,368,329.

[51] Int. Cl.$^6$ ............................................. B60R 21/26
[52] U.S. Cl. .................................. 280/736; 280/741; 102/531; 422/166
[58] Field of Search ............... 280/741, 736, 742, 735, 280/734, 728 R; 102/530, 531, 202, 288, 373; 422/164, 165, 166

[56] References Cited

U.S. PATENT DOCUMENTS

| | | |
|---|---|---|
| 3,713,667 | 1/1973 | Blanchard ............................ 280/735 |
| 3,718,332 | 2/1973 | Jones .................................... 280/741 |
| 3,741,580 | 6/1973 | Vos ....................................... 280/735 |
| 3,972,545 | 8/1976 | Kirchoff et al. ..................... 280/741 |
| 4,358,998 | 11/1982 | Schneiter et al. .................. 280/741 |
| 4,547,342 | 10/1985 | Adams et al. ....................... 280/741 |
| 4,878,690 | 11/1989 | Cunningham ....................... 280/741 |
| 4,890,860 | 1/1990 | Schneiter ............................ 280/741 |
| 4,998,751 | 3/1991 | Paxton et al. ....................... 280/741 |
| 5,346,254 | 9/1994 | Esterberg ........................... 280/741 |

FOREIGN PATENT DOCUMENTS

| | | | |
|---|---|---|---|
| 4006741 | 8/1991 | Germany ............................ 280/736 |
| 9222440 | 12/1992 | WIPO ................................. 280/736 |

Primary Examiner—Margaret A. Focarino
Assistant Examiner—Peter C. English
Attorney, Agent, or Firm—Nick C. Kottis; Gerald K. White

[57] ABSTRACT

A device is provided for increasing the surface area of the gas generant used in an automotive safety air bag module. Depending on crash conditions, the surface area of the gas generant is increased by shattering the gas generant wafers. One embodiment utilizes a squib having a high brisance zone which upon activation shatters the gas generant wafers. Alternatively, a dual function squib is used which can produce mechanical forces which force a breaking object to impact on the gas generating wafers thereby shattering them and increasing the surface area of the gas generant.

19 Claims, 10 Drawing Sheets

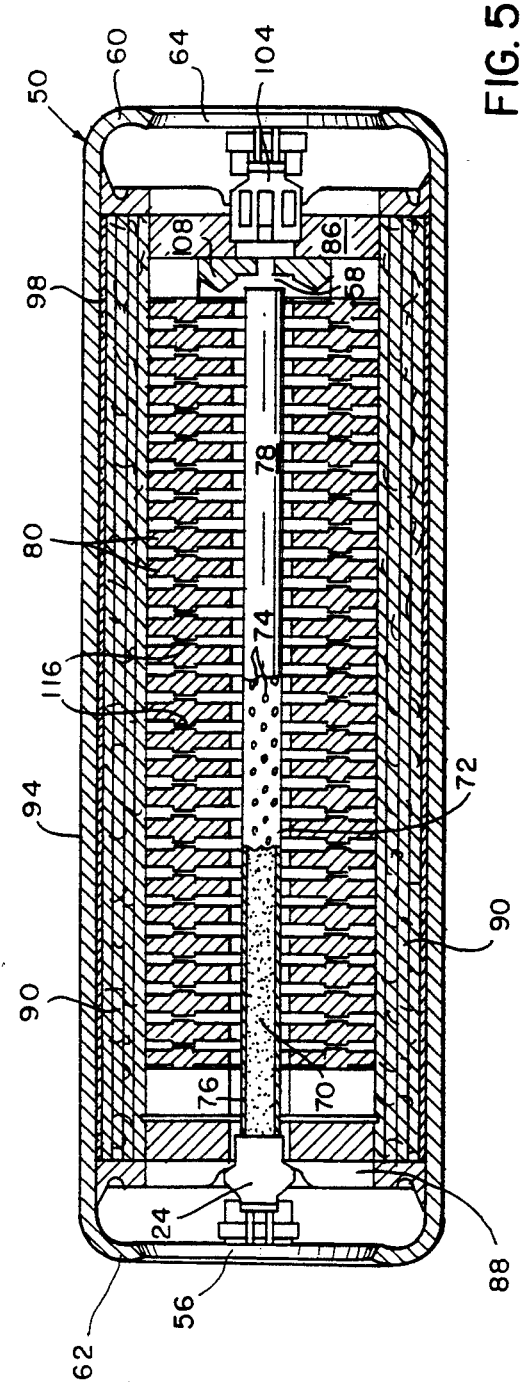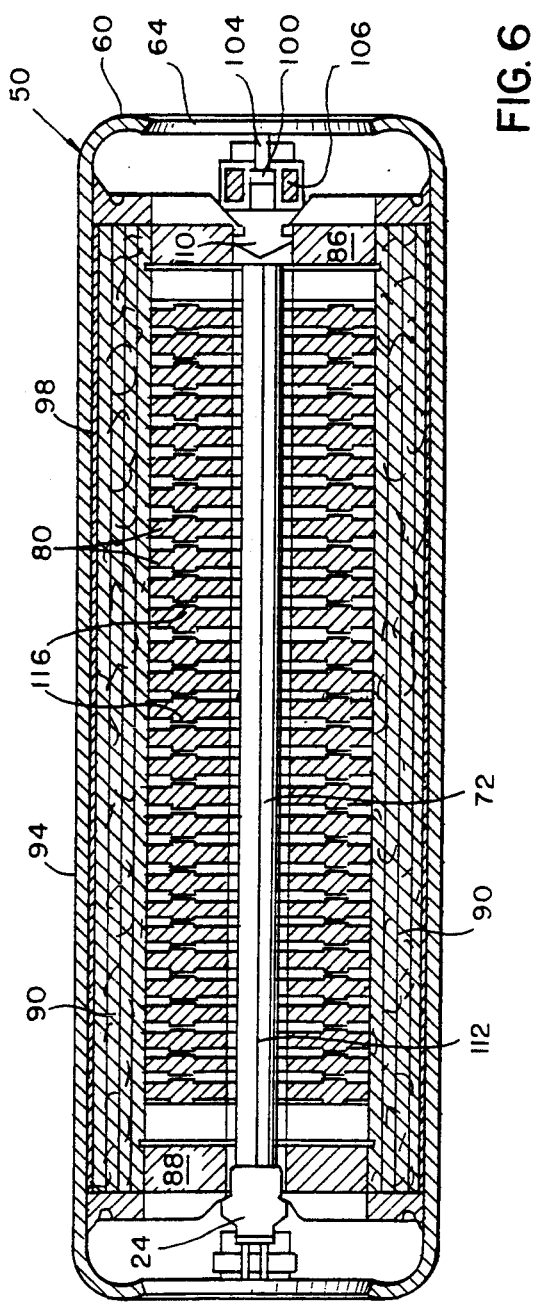

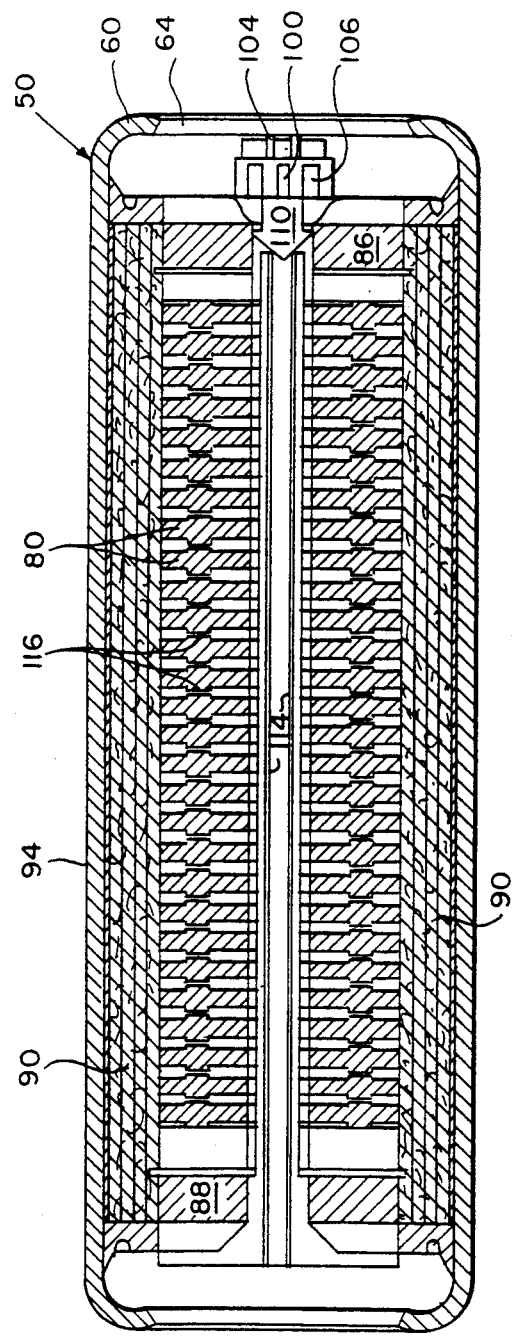
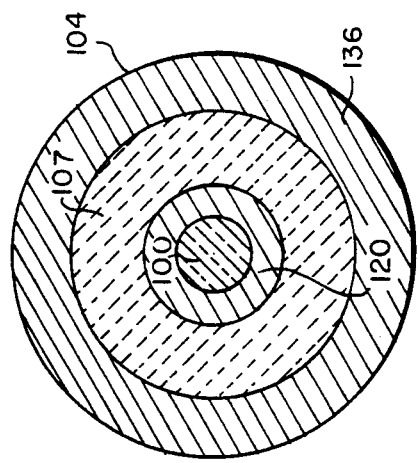
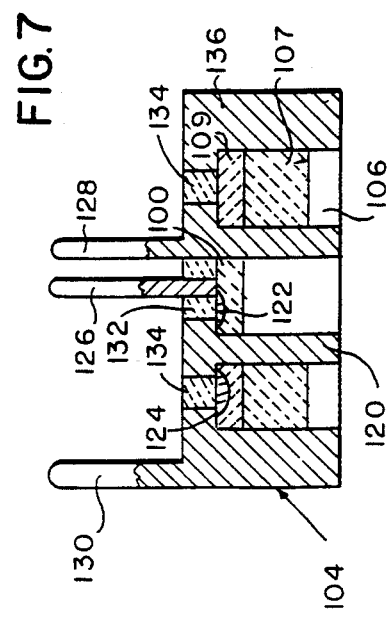
FIG. 6a
FIG. 7a
FIG. 7

DUAL STAGE INFLATOR

This is a divisional of application Ser. No. 08/025,505, filed on Mar. 3, 1993, now U.S. Pat. No. 5,368,329.

BACKGROUND OF THE INVENTION

1. Field of the Invention

The present invention relates to gas generators for inflating vehicle inflatable restraint cushions, commonly known as air bags, so as to provide impact protection to occupants of the passenger vehicles. More particularly, this invention relates to an improvement in providing varying rates of inflation of the air bag dependent on crash conditions and/or occupant conditions.

2. Description of Related Art

An air bag restraint system, referred to as a module, typically includes a canister which encloses a gas generator or as, it is commonly known, an inflator, and at least part of an air bag, and a cover which conceals the module from view. When the vehicle is involved in a collision, a crash signal initiates operation of the inflator to cause the air bag to deploy. The inflator produces an inert gas (e.g., nitrogen) which is directed under pressure into the air bag to force the air bag out of the canister incorporated into the module and into the passenger compartment of the vehicle. In a pyrotechnic type inflator, gas is produced by the burning of a gas generating material. As the air bag is forced out of the container, pressure exerted on the cover causes selected portions of the cover to separate in a predetermined manner along tear seams to enable the air bag to be directed into the passenger compartment. As the air bag is directed into the passenger compartment, it is inflated by the continued flow of gas produced by the inflator.

With a pyrotechnic type inflator, the rate at which the gas generant must burn in order to provide gas at a sufficient rate to inflate the air bag, so as to protect the occupant, is dependent on a number of factors; i.e., the speed at which the vehicle is moving, the severity of the crash, the size and location of the occupant and the temperature of the inflator. For example, when a vehicle moving at a moderate rate of speed (30 miles per hour/50 kph) with an inflator at a temperature of approximately 70° F. (21° C.) is involved in a collision, a "normal" rate of gas production from the inflator must be sufficient to deploy the air bag within the time required to protect the occupants. When a vehicle moving at a high rate of speed (50 mph/85 kph) impacts another vehicle moving at approximately the same speed, a higher rate of gas production from the inflator may be required to provide the same level of protection to the occupants.

An additional concern is the capability to compensate for the reduced reaction rate of cold gas generant by increasing the gas production rate of the gas generant. When a vehicle moving at a high rate of speed (50 mph/85 kph) with an inflator that is cold, due to being maintained at sub-zero temperatures −20° F. (−29° C.) collides with a stationary object, it may be necessary to compensate for the reduced rate of gas production caused by the low temperature in order to deploy the air bag in sufficient time to protect the occupants.

In addition, in order to provide a less sudden and softer action of the air bag cushion more closely tailored to the size and weight of the occupant so as to reduce the chance of possible injury to the occupant because of air bag cushion deployment, it is desired that the initial inflation of the air bag cushion be more gradual but with the same or only a slightly longer time required for total inflation. There is a greater need for this gradual inflation when a small child is present on the passenger side.

Prior art solutions to these problems have been accomplished by two-stage, or dual performance inflators which use separate cylinders, bulkheads, and alternated ignition trains incorporated in inflators of this type. Such prior art solutions are disclosed in Kirchoff et al., U.S. Pat. No. 3,972,545; Schneiter el al., U.S. Pat. No. 4,358,998; and Blanchard, U.S. Pat. No. 3,713,667.

Kirchoff et al., U.S. Pat. No. 3,972,545, which invention is assigned to the assignee of the present invention, is incorporated herein by reference. Kirchoff discloses a consumable partition in a gas generator divided into two chambers each chamber containing gas generant material and being ignitable by a separate igniter. An impact sensor determines whether one or both of the squibs are fired on impact, depending upon the force of a collision, and hence, the rate at which the gas bag is filled with gas.

Schneiter el al., U.S. Pat. No. 4,358,998, which invention is assigned to the assignee of the present invention, discloses an igniter which causes the gas generating material in the inflator to ignite in a progressive manner so as to inflate the bag slowly at the onset but more rapidly later as inflation progresses. The igniter has a disc delay between two portions thereof whereby the gas generant material around one portion is ignited immediately and then after a delay, the gas generating material around the other portion is ignited.

Blanchard discloses a pressurized container for providing gas to an air bag cushion, where the passage communicating with the air bag has multiple orifices. Each orifice is closed to the pressure vessel by a diaphragm rupturable by electrically fired detonators. The number of orifices to be opened is dependent on the force of a collision and the rate at which the air bag is to be filled with gas. A similar solution to this problem has been suggested by Vos, U.S. Pat. No. 3,741,580, which discloses a multiple level flow rate of a pressurized fluid to a cushion by selective operation of serially disposed flow control orifices in accordance with predetermined levels of intensity of impact.

SUMMARY OF THE INVENTION

An object of this invention is to provide performance equivalent to that of a two-stage or dual performance inflator without the usual complication of separate cylinders, bulkheads and alternate ignition trains normally incorporated in an inflator of this type.

Another object of this invention is to provide a gas generator which produces gas at different rates depending on the output of a crash sensor which detects varying amounts of force produced by an impact between a passenger vehicle and another object.

Another object of this invention is to provide a gas generator which can compensate for the reduced reaction rate of a gas generating material due to below ambient temperature reactants.

Another object of this invention is to provide a gas generator which can provide different rates of gas production depending on the weight of an occupant.

Another object of this invention is to provide a gas generator which can provide gas at different rates depending on the severity of a collision.

These and other objectives of the invention, which will become apparent from the following description, have been achieved by a novel gas generator which incorporates a secondary squib coupled with shaped wafers to accommodate dual performance of an air bag inflator while maintaining a single enclosed stack of gas generant wafers, with it's accompanying simplicity. Dual performance is accomplished by shattering of a stack of gas generant wafers by means of pyrotechnic or mechanical means through use of a secondary squib. Ignition of the basic pyrotechnic is to be accomplished by the functioning of the primary squib. In the event of a crash, the electronics module delivers an electrical impulse to a primary squib which lights an ignition train, which in turn lights the gas generant. In the event of the necessity of higher performance, the electronics module delivers a secondary electrical impulse to a different squib in the gas generator. The output of this squib is designed to shatter the gas generant wafers in a stack in one of several different ways. The mechanical output of this squib is designed to drive a mechanical plate or plug into the gas generant wafers. Alternately, the squib is designed to create a shock wave which propagates into the generant stack, thus fracturing the gas generant wafers. The squib also serves to increase the ignition sources into the generant, causing the inflator to burn faster. The increased surface area created by this fracturing serves to increase performance of the inflator. The reaction rate of the gas generant material itself remains constant. In order to closely control the fracture and gas production rate of the gas generant, the wafers can be shaped in such a way as to repeatably fracture along established fracture lines. The gas generant wafers may be shaped with a pattern on the inside diameter and the outside diameter. Alternately, they may be scored or raised in sections along either face of the wafer in order to provide a preferred and repeatable fracture path.

The gas generator of this invention comprises an elongated housing including a tubular combustion chamber having a pair of end portions, and means for closing the end portions thereby defining at least one combustion chamber. A gas generating material formed into a plurality of gas generating wafers is arranged along the length of the tubular combustion chamber and spaced from each other in a side-by-side array forming a generant stack. At least one igniter means to ignite the gas generating wafers is inserted in spaced relation to the gas generant. A squib is provided which upon activation by a signal from a sensor ignites the igniter means. A vehicle inflatable restraint cushion is attached in spaced relation to the gas generator. Aperture means are provided in the tubular combustion chamber to direct generated gas from the tubular combustion chamber to the vehicle inflatable restraint cushion. At least one squib has a high brisance output which upon activation by a second signal from the sensor shatters the gas generating wafers thereby increasing the surface area of the gas generating material.

Further, the gas generator of this invention may comprise an elongated housing including a tubular combustion chamber having a pair of end portions and means for closing the end portions thereby defining at least one combustion chamber. A gas generating material formed into a plurality of gas generating wafers is arranged along the length of the tubular combustion chamber and spaced from each other in a side-by-side array forming a gas generant stack. At least one igniter means to ignite the gas generating wafers is inserted in spaced relation to the gas generant. A radially extending plate is located in spaced relation to at least one end of the gas generating wafer stack. A squib is provided which, upon activation by a signal from a sensor, ignites the igniter means. A vehicle inflatable restraint cushion is attached in spaced relation to the gas generator. Aperture means are provided in the tubular combustion chamber to direct generated gas from the tubular combustion chamber to the vehicle inflatable restraint cushion. At least one squib has a high output which upon activation by a second signal from a sensor causes the radially extending plate to impact on the gas generating wafers thereby causing the gas generating wafers to shatter.

Alternatively, the gas generator of this invention may comprise an elongated housing including a tubular combustion chamber having a pair of end portions and means for closing the end portions thereby defining at least one combustion chamber. A gas generating material formed into a plurality of gas generating wafers is arranged along the length of the tubular combustion chamber and spaced from each other in a side-by-side array. The gas generating wafers have through apertures defining inner walls generally in the central region of each wafer. An igniter tube having a first end and a second end, passes through the apertures in the gas generating wafers. A fracture means is located in spaced relation to at least one end of the igniter tube. A squib is provided which upon activation by a signal from a sensor ignites the igniter tube. A vehicle inflatable restraint cushion is attached to a canister containing the gas generator.

Apertures are provided on the outer surface of the tubular combustion chamber for directing generated gas from the tubular combustion chamber into a vehicle inflatable restraint cushion. At least one squib has a high output mode which upon activation by a second signal from the sensor impacts on the fracture means forcing the fracture means into at least one end of the tube forcing the tube to radially expand and engage the inner wall surfaces of the aperture of the gas generating wafers causing the gas generating wafers to shatter. The shattering of the gas generant wafers increases the surface area thereof. Also, metal rods passing through apertures in the gas generant can be used when an igniter tube is not used. In this embodiment, fracture means would be forced between at least two rods which are in spaced relation from one another, thereby pushing the rods apart and shattering the gas generant.

BRIEF DESCRIPTION OF THE DRAWINGS

With this description of the invention, a detailed description follows with reference being made to the accompanying figures of drawings which form part of the specification, in which like parts are designated by the same reference numbers, and of which:

FIG. 5 is a cross-sectional view illustrating the gas generator of this invention with a dual function squib and an impact plate attached at one end of the combustion chamber and a standard squib attached at the opposite end of the combustion chamber;

FIG. 6 is a cross-sectional view illustrating the gas generator of this invention with a dual function squib and a breaking body attached at one end of the combustion chamber and a standard squib attached at the opposite end of the combustion chamber;

FIG. 6a is a cross-sectional view illustrating the gas generator of FIG. 6 with rods installed in place of the igniter tube;

DESCRIPTION OF THE PRIOR ART

Figure 1:
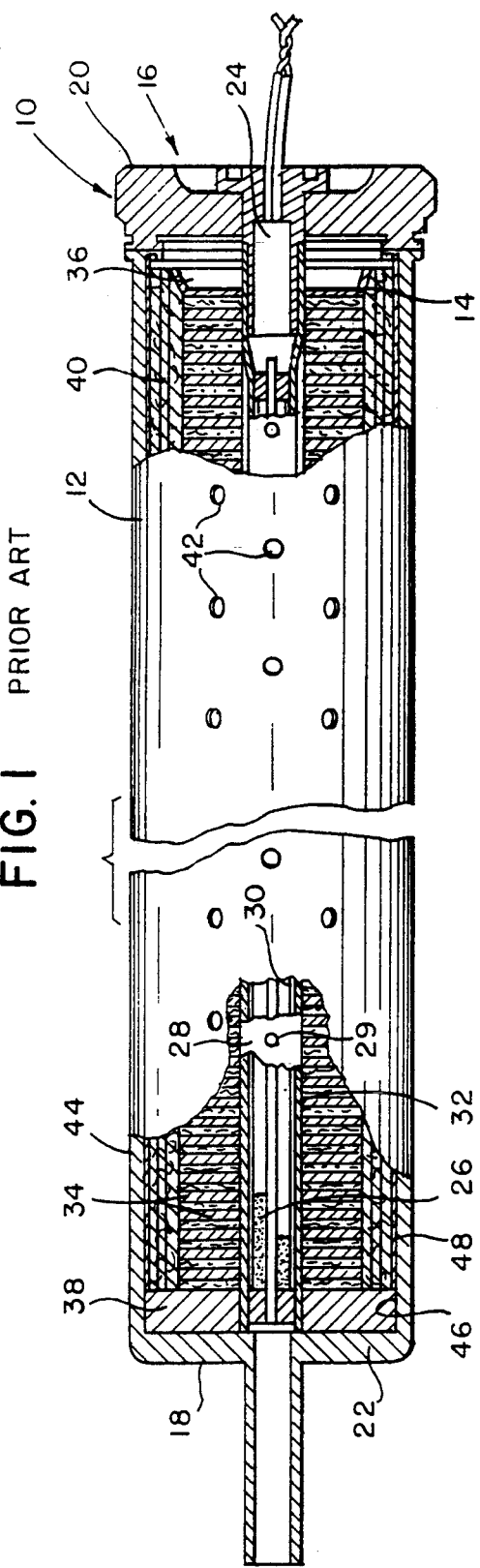
FIG. 1 is a cross-sectional view illustrating a conventional gas generator having a single stage inflator.

Referring to FIG. 1, a gas generator of the prior art shown generally at 10 is provided for producing a gas to inflate an air bag cushion (not shown) from a module canister (not shown). The gas generator 10 includes an elongated housing 12 defining a combustion chamber 14. The combustion chamber 14 has a first end 16 and a second end 18 covered by a first end cap 20 and a second end closure 22 respectfully. A standard squib 24 for initiating igniter material 26 is normally located at one end of the gas generator 10. The igniter material 26, is contained in an open-ended igniter tube 28, having apertures 29 in the wall 32 thereof, located generally in the radial center of the gas generator 10. The outside of the igniter tube 28 is wrapped with aluminum foil 30 to contain the igniter material 26 within the igniter tube 28. Extending radially outward from the igniter tube 28 is gas generant material which is formed into wafers 34. The wafers 34 are arranged along the length of the combustion chamber 14 and separated from the first end 16 and the second end 18 by a spacer 36 and a damper pad 38 respectively. Radially outward of the wafers 34 is a filter pack 40 made of filter screen for cooling the generated gas and filter material to remove particulate matter. A number of vent holes 42 pass through the outer wall 44 of the elongated housing 12 of gas generator 10. The inner surface 46 of the outer wall 44 is covered with aluminum foil 48 to stop moisture from reaching the gas generant. A standard squib 24 or standard squib output as described herein is one which lights igniter material 26 without significant brisance or output which would result in the modification of the physical structure of the gas generant material by mechanical means.

DETAILED DESCRIPTION OF THE INVENTION

Figure 15:
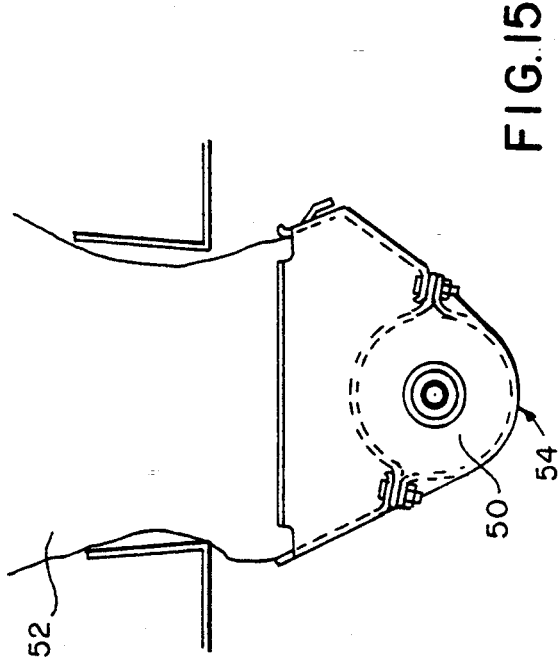
FIG. 15 is an end plan view illustrating an air bag in a deployed condition with a module canister containing a gas generator.
Figure 2:
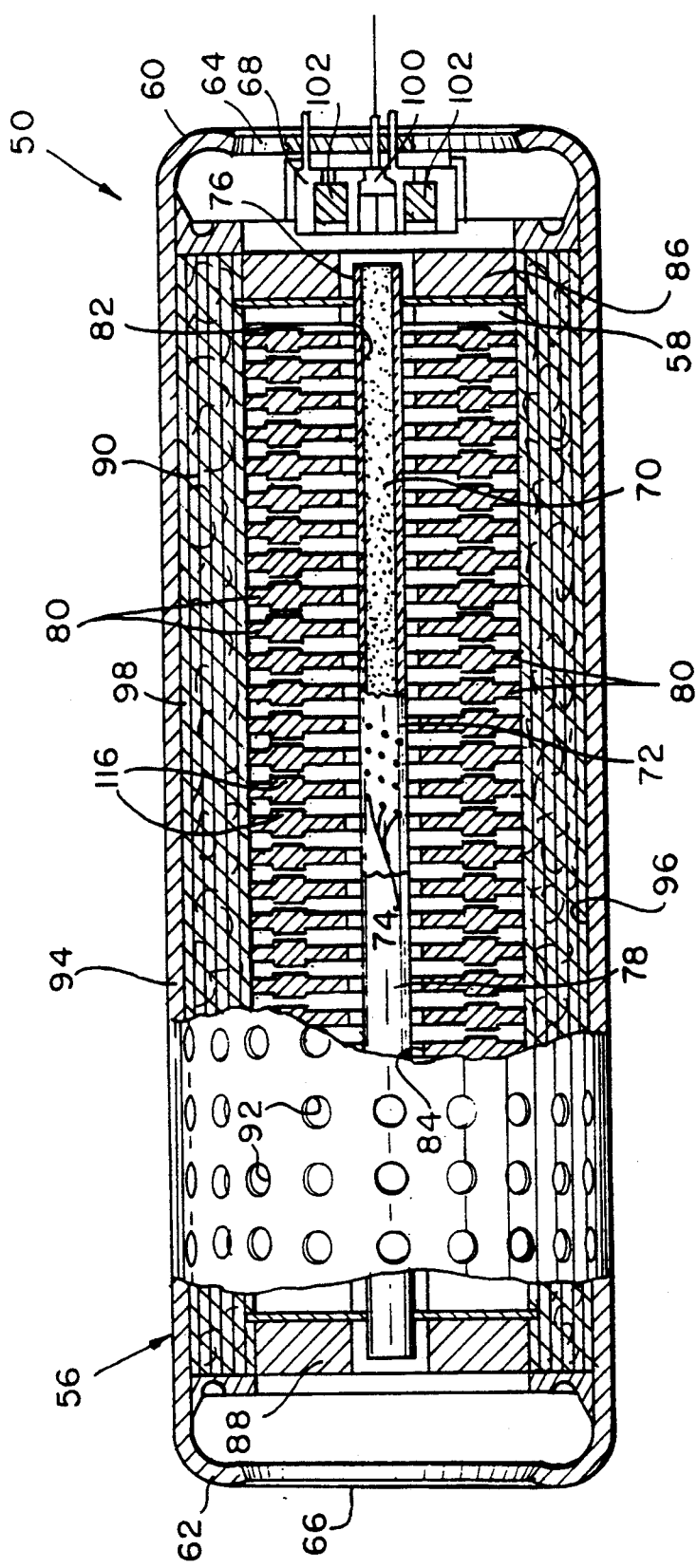
FIG. 2 is a cross-sectional view illustrating the gas generator of this invention with a dual function squib attached to one end of the combustion chamber.

As best seen in FIG. 2, a gas generator of this invention shown generally at 50 is provided for producing a gas to inflate an air bag cushion 52 (as shown in FIG. 15) from a module canister 54 (as shown in FIG. 15). The gas generator 50 includes an elongated housing 56 defining a combustion chamber 58. The combustion chamber 58 has a first end 60 and a second end 62 covered by a first end cap 64 and a second end cover 66, respectively. A dual function squib 68 of this invention for initiating igniter material 70 is normally located at one end of the gas generator 50. The igniter material 70, is contained in an open-ended igniter tube 72 having through apertures 74 in the wall 76 of igniter tube 72, located generally in the radial center of the gas generator 50. The outside of the igniter tube 72 is wrapped with aluminum foil 78 to contain the igniter material 70 within the igniter tube 72. Extending radially outward from the igniter tube 72 is gas generant material which is formed into wafers 80. The gas generating wafers 80 have through apertures 82 which define an inner wall 84 generally in the central region of each wafer 80. The wafers 80 are arranged along the length of the combustion chamber 58 and are separated from the first end cap 64 and the second end cover 66 by a spacer 86 which is in the form of a hollow cylinder and a damper pad 88, respectively. Radially outward of the wafers 80 is filter pack 90 made of filter screen for cooling the gas generated and filter material to remove particulate matter from the gas which work in combination with the gas generant to provide a cool and filtered gas. The filter pack 90 is similar to that disclosed in U.S. Pat. No. 4,878,690. The '690 patent is assigned to the assignee of the present invention. The disclosure of the '690 patent is incorporated herein by reference. A number of vent holes 92 pass through the outer wall 94 of the elongated housing 56 of gas generator 50. The inner surface 96 of the outer wall 94 is covered with a barrier foil 98 to stop moisture from reaching the gas generant.

Figure 3:
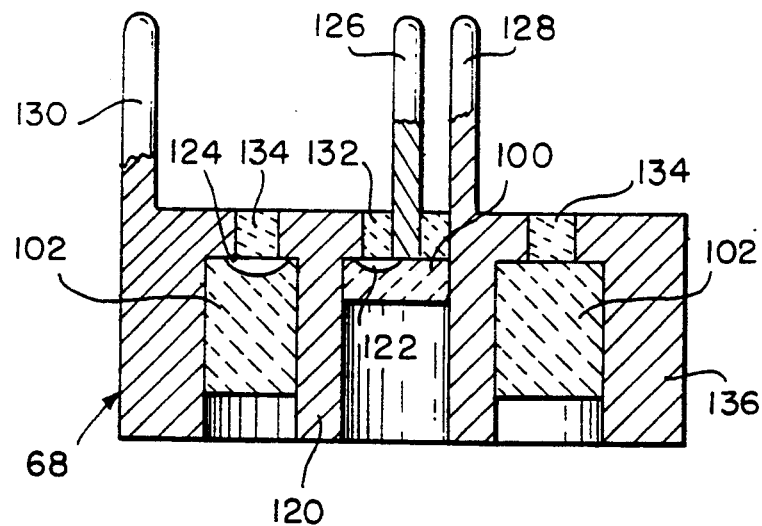
FIG. 3 is an enlargement of the cross-sectional view of the dual function squib of FIG. 2.
Figure 3A:
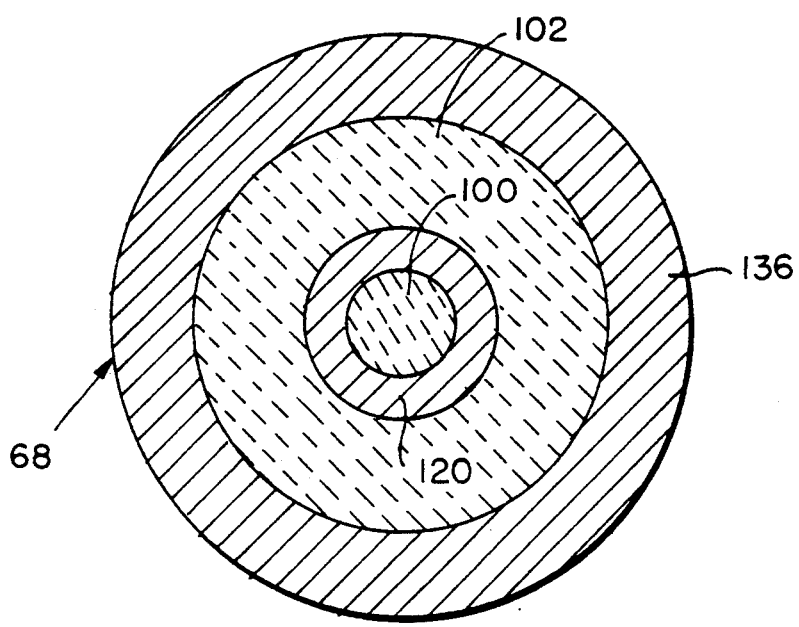
FIG. 3a is a cross-sectional view of the dual function squib of FIG. 3.

The dual function squib 68 as shown in FIG. 2 and as shown enlarged in FIGS. 3 and 3a contains a normal firing zone 100 and a high brisance firing zone 102. A normal firing zone 100 or standard squib output as described herein is one which lights igniter material 70 without significant brisance or output which would result in the modification of the physical structure of the gas generating material by mechanical means. A standard squib 24 is shown in FIG. 1 for comparison. The normal firing zone contains for example, approximately 130 mg. of a mixture of TiKClO4 (powder form of grades standardly used in pyrotechnics). The high-brisance firing zone 102 contains, for example, approximately 20 mg. of (PbN3) and 110 mg. of HMX, octahydrotetranitrotetrazocine (powder form of grades standardly used in pyrotechnics). Under "normal" conditions (light-weight occupant in the passenger side seat) the normal firing zone 100 would be triggered by a first output from a sensor (not shown) which in turn lights the igniter material 70 burning within igniter tube 72. The burning igniter material 70 burns through barrier foil 78 and ignites gas generant wafers 80. Under special conditions (an adult occupant in the passenger side seat) the high brisance firing zone 102 would be triggered by a second output from a sensor (not shown) in place of, simultaneously with, or prior to the firing of the normal firing zone 100 to produce the maximum rate of gas production. The shock wave emanating from the high brisance firing zone will shatter the generant wafers 80, thereby increasing the surface area of the generant wafers 80. The increased surface area will increase the gas production rate of the generant wafers, and thereby increase the quantity of gas produced per unit of time. The firing of the normal firing zone 100 followed by a time delay (5 to 10 milliseconds) after which the high-brisance squib 102 fires will result in a gas production rate intermediate to the minimum and maximum production rates. This increased gas production rate will be manifested in many different forms, for example, increased volumetric flow rate of the gas, increased pressure within the gas generator 50, and the production of a given volume of gas within a reduced period of time.

Figure 4:
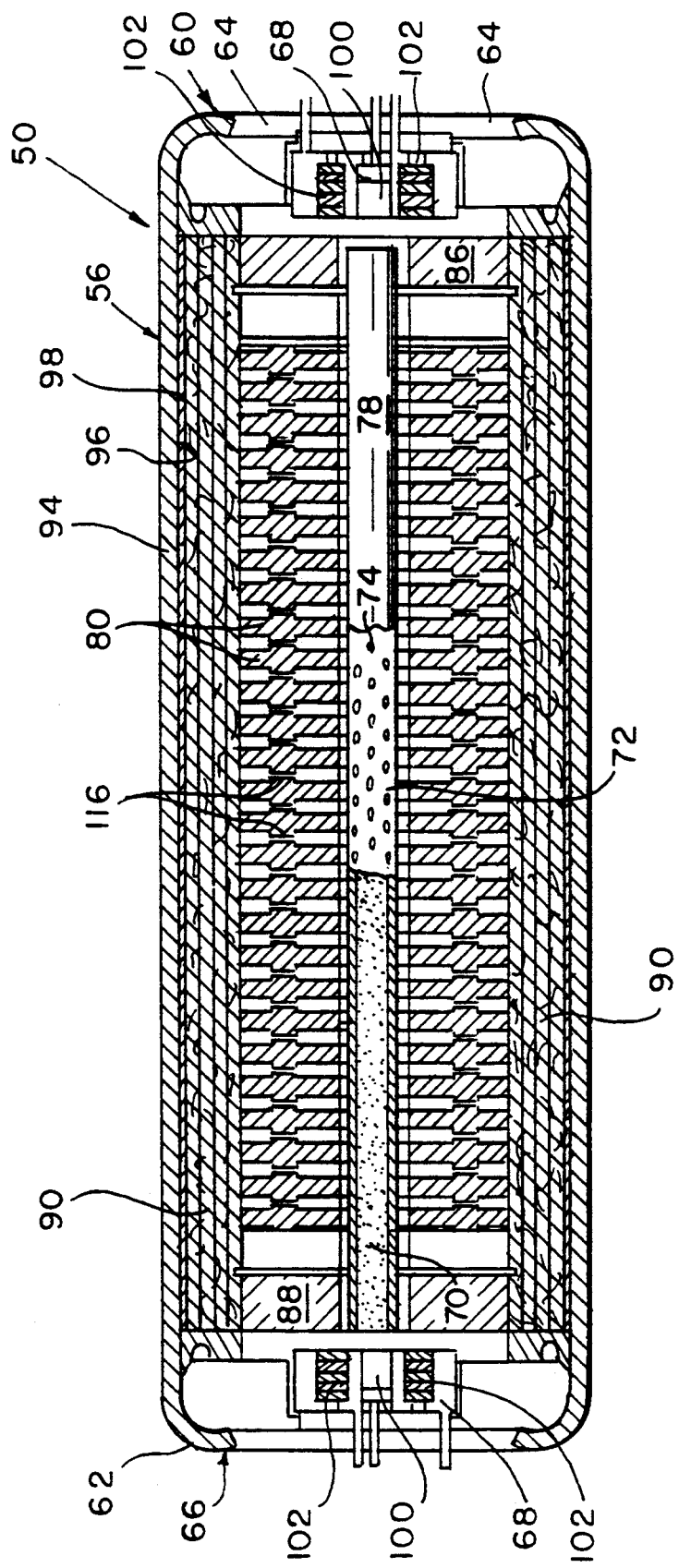
FIG. 4 is a cross-sectional view illustrating the gas generator of this invention with a dual function squib attached at both ends of the combustion chamber.

The brisance of the high brisance firing zone 102 should be such that it shatters a substantial amount of the generant wafers 80. The shattering of the generant wafers 80 produces at least a 100% increase in the surface area of the generant, and preferably a 400% increase, and more preferably a 900% increase in the surface area of the gas generant wafers 80. Dual function squibs 68 can be attached to both ends of the gas generator 50 as shown in FIG. 4 to shatter a higher percentage of the gas generant wafers 80.

Figure 7B:
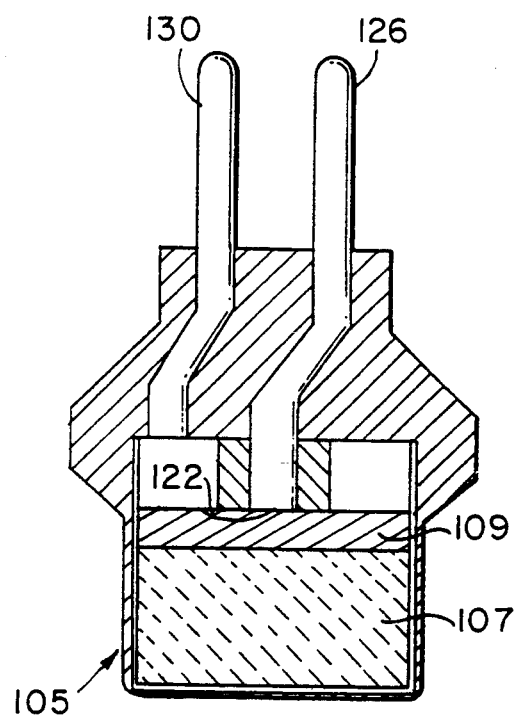
FIGS. 7 and 7a are enlargements of the cross-sectional view of the dual function squib of the gas generator shown in FIGS. 6 and 6a, and FIG. 7b is an enlarged cross-sectional view of a single function high output squib.
Figure 8:
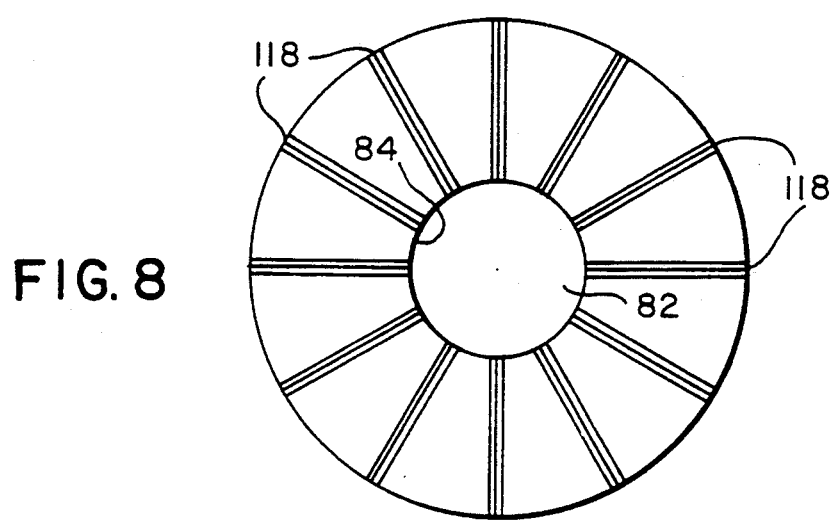
FIGS. 8, 8a, 9, 9a, 10, and 10a are front plan views and side views respectively of a generant wafer illustrating fracture lines.
Figure 8A:
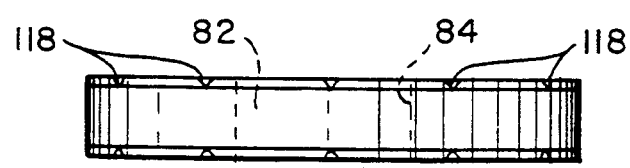

In a second embodiment of this invention, as shown in FIG. 5 and as shown enlarged in FIGS. 7 and 7a, a dual function squib 104 of this invention having a standard firing zone 100, as described hereinabove, and a high output firing zone 106. A single function squib 105 having a high output firing zone 106, as shown in FIG. 7b can also be used. The high output firing zone 106 may contain, for example 200 mg $BKNO_3$ 107 and 30 mg (lead trinitroresorcinate) 109 or, as it is more commonly known, lead styphnate $C_6H(NO_2)_3(O_2Pb)$. These compounds are used in powder form of grades standardly used in pyrotechnics. The standard firing zone 100 would function as described hereinabove. The output of the high output firing zone 106 would be triggered during special conditions. The output of the high output firing zone 106 would impact on fracture plate 108 which would in turn be driven into the stack of generant wafers 80 causing them to shatter, thereby increasing the surface area of the gas generant wafers 80. Again, as with the high brisance output squib the output of the dual function squib 104 should be such that it shatters a substantial amount of the generant wafers 76. The shattering of the generant wafers 80 produces at least a 100% increase in the surface area of the generant, and preferably a 400% increase, and more preferably a 900% increase in the surface area of the generant. A standard squib 24 can be attached to the opposite end of the gas generator 50, as shown in FIG. 5, or the opposite end can be sealed with a second end closure 22, as shown in FIG. 1.

In another embodiment of this invention, as shown in FIG. 6, a high output dual function squib 14 having a standard firing zone 100, as described hereinabove, and a high output firing zone 16 as described hereinabove. The high output firing zone 16 may be prepared as discussed hereinabove. The output of the high output firing zone 106 would be triggered during special conditions. The output of the high output firing zone 106 would impact on a breaking body 10 which would in turn impact on the end of the igniter tube 72 causing it to split lengthwise. The sections of the split igniter tube 72 will push against the inside of the generator wafer aperture causing the generator wafers to fracture, thereby increasing the surface area of the generant. To aid in the efficient splitting of igniter tube 72 a rupture seam 112 or a number of rupture seams 112 may be placed along the length of the igniter tube 72 to insure that the igniter tube 72 will split in the desired manner. In gas generator designs which do not use an igniter tube 72 a plurality of rods 114 which can be pushed apart by the breaking body 10 may be used, as shown in FIG. 6a.

Again, as with the high brisance output squib, the output of the high output firing zone 106 in conjunction with the breaking body 110 should be such that it shatters a substantial amount of the generant wafers 80. The shattering of the generant wafers 80 produces at least a 100% increase in the surface area of the generant, and preferably a 400% increase, and more preferably a 900% increase in the surface area of the generant. A standard squib 24 can be attached to the opposite end of the gas generator 50, as shown in FIG. 5, or the opposite end can be sealed with a second end closure 22, as shown in FIG. 1.

Figure 9:
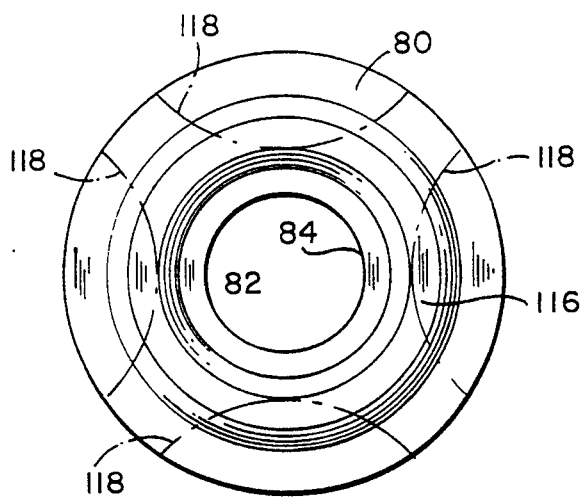
Figure 9A:
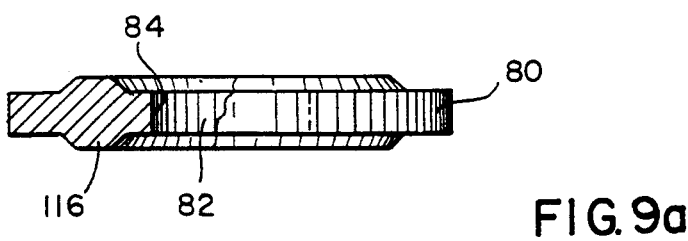
Figure 10:
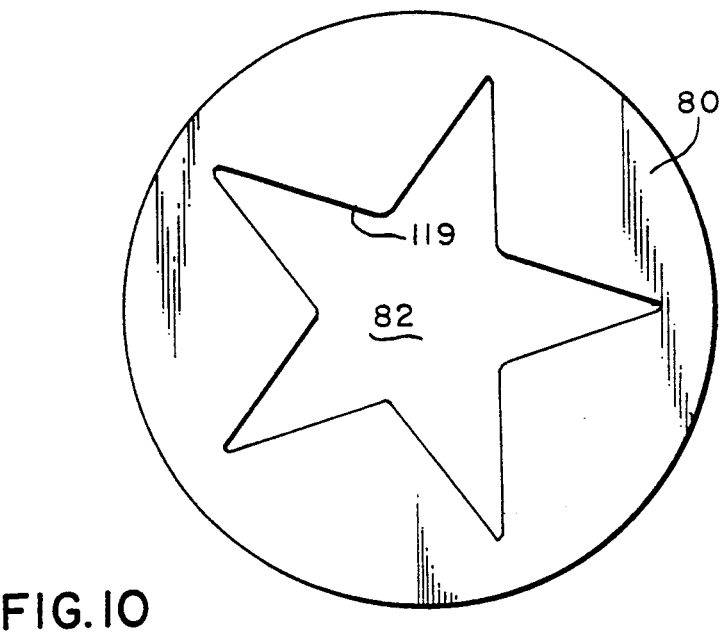
Figure 10A:
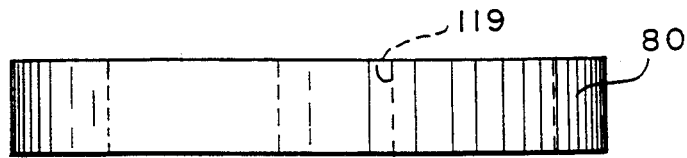

The gas generant wafers 80 used with this invention are similar to those described in Schneiter, U.S. Pat. No. 4,890,860, which patent is assigned to the assignee of the present invention. The '860 patent is incorporated herein by reference. In order for the gas generant wafers 80 to function correctly with the high brisance firing zone 102 and the high output firing zone 106 in conjunction with the fracture plate 108 or breaking body 110, screen spacers should not be used. Instead, raised zones or bumps 116, as shown in FIGS. 2, 9, and 9a should be used to separate the wafers. To insure that the generant wafers 80 will shatter in the desired manner when required fracture lines 118 on gas generant wafers 80, as shown in FIGS. 8, 8a, 9, and 9a may be placed on the surface of the generant wafer 80. Also, an aperture in the form of a star pattern 119, as shown in FIGS. 10 and 10a, may be used to insure that the generant wafers 80 will shatter in the desired manner.

The filter pack 90 used with this invention to filter and cool the gas produced by the gas generant wafers 80 can be any filter pack 90 standardly known to those having ordinary skill in the art. For example, one filter pack 90 which may be utilized is described in U.S. Pat. No. 4,878,690 to Cunningham, which patent is assigned to the assignee of this invention and which patent is incorporated herein by reference.

The design of the dual function squibs 68 and 104 closely mimics the design of a single output squib. A normal output squib (not shown in detail) consists typically of a solid metal ring (or header) which encases a quantity of glass. The glass has been melted to provide a high pressure hermetic seal within the header (referred to as a Glass-To-Metal-Seal or GTMS). Within the glass is one or more metal pins. The glass serves to electrically insulate the pin from the header. Welded between the pin and the header is a small diameter high resistance wire (bridgewire). In close proximity to the bridgewire is a quantity of pyrotechnic material. When an electrical current is passed through the bridgewire by means of the pin and header, its temperature rises. This increase in temperature is passed to the pyrotechnic material which ignites when sufficient energy is absorbed by it.

The design of the dual function squibs, as shown in FIGS. 3, 3a and 7, utilizes two pyrotechnic charges, the normal firing zone 100 and a high brisance 102 or high output firing zone 106, separated one from another by a metal ring or header 120 so that the ignition and consumption of one charge does not immediately ignite the other. In addition, the charges are ignited by two different bridgewires, a primary bridgewire 122, for the normal firing zone 100, and a secondary bridgewire 124 for the high brisance firing zone 102 or the high output firing zone 106. These bridgewires are separated one from another in such a manner that the passage of current through one does not cause current to pass through the other. In order to assure this, the design of the dual function squibs 68 and 104 contains at least two quantities of glass or other insulating material, two bridgewires 122 and 124 or other ignition means, and at least three electrical connections, central pin 126, an inner pin 128, and an outer pin 130.

In the squib of the present invention an electrical current is passed through the central pin 126, through the primary bridgewire 122 across the first glass insulator 132 and through the inner metal ring or header 120, igniting the normal firing zone 100 which vents out the opposite end. A second current is passed through the inner pin 128 inner metal ring or header 120, through the secondary bridgewire 124 across the second glass insulator 134 and through the outermost metal ring or header 136, igniting the high brisance firing zone 102 or the high output firing zone 106 which vents out the opposite end, surrounding the output of the normal firing zone 104. In this manner, output of the dual function squibs 68 and 104 can be provided by the interior charge only; the exterior charge only; the interior charge and exterior charge at the same time; or the interior charge and exterior charge with a time delay between them. Other arrangements with multiple pins in a single quantity of glass or side-by-side are possible. Other components aid in manufacture or functioning such as coatings, platings, shunt mixes, and electrical insulators typically used for squib design are not shown for simplicity.

The igniter tube used with this invention is any igniter known in the art. Modification of the igniter tube 72 by providing rupture seams 112 may be helpful in aiding in the splitting of the igniter tube 72 in response to an impact by the breaking body 110. The rupture seams can be cut into the surface of the igniter tube 72 by mechanical means such as metal cutting or metal scoring tools.

The module canister 54 for use with this invention can be any standardly known to those of ordinary skill in the art. Modification of the second end 62 and the second end cover 66 may be necessary to accommodate the second dual function squib 68. In order to minimize the weight the gas generator 50, housing 54, the first end cap 64 and the second end cover 66, respectively, are composed of aluminum.

The gas generator 50 is assembled by inserting the igniter tube 72, damper pad 88, gas generate wafers 80, and spacer 86 into the elongated housing 56. The first end cap 64 containing the dual function squib 68 is attached to the first end 60 of elongated housing 56 preferably by an inertia welding process similar to that described in U.S. Pat. No. 4,547,342, which patent is assigned to the assignee of this invention. The '342 patent is incorporated herein by reference. The squib of this invention could be inserted into the first end cap 64. The second end cover 66 can be a standard end or it can be modified to hold a standard squib 24 or one of the novel squibs of this invention; for example, a dual function squib 68 having a high brisance firing zone 102 or the dual function squib 104 having a high output zone 106.

A sensor as described in Jones, U.S. Pat. No. 3,718,332, or a similar sensor, could be used to sense varying levels of impact. Temperature sensors known in the art would indicate when the temperature at which the inflator is stored is below a critical temperature. A weight sensor could detect the presence of a small person or child in the passenger seat. An appropriate microprocessor can be used to produce a time delay between the triggering of the normal firing zone 100 and the high brisance firing zone 102 or high output firing zone 106 resulting in, a gas production rate between that produced by the normal firing zone 100 and the high brisance firing zone 102 or high output firing zone 106.

Figure 11:
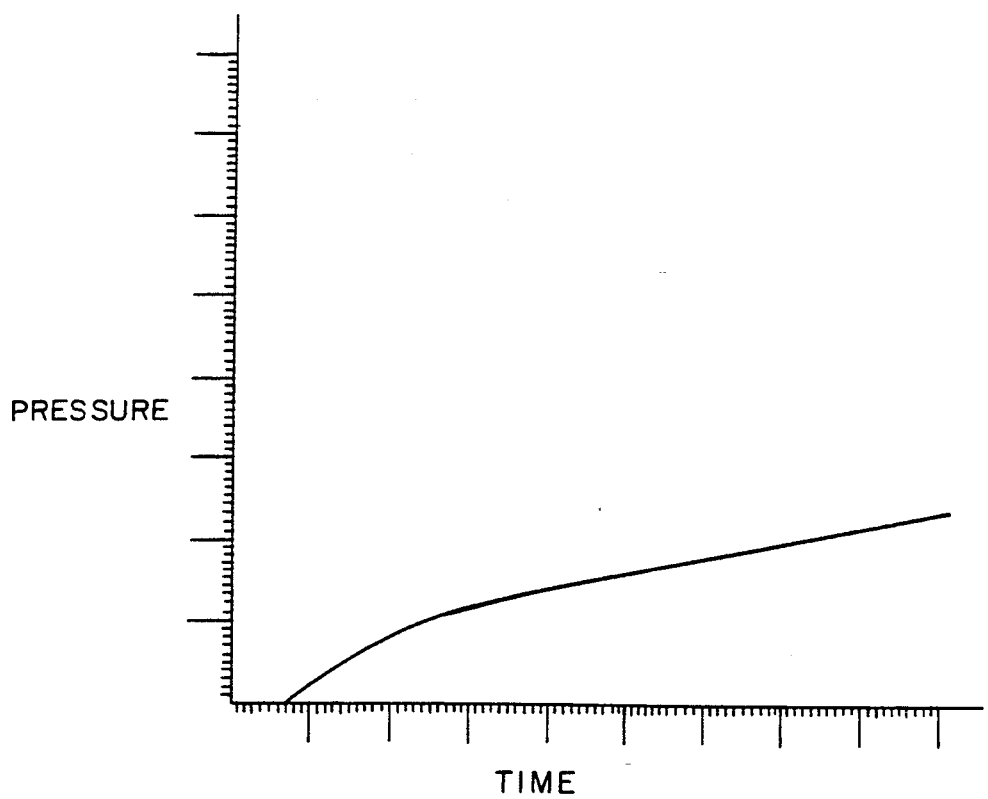
FIGS. 11 through 14 are a series of graphs illustrating the pressure vs. time curves for the invention produced under different operating conditions.

Functioning of the gas generator 50 begins with an electrical signal from a crash sensor (not shown) through lead wires (not shown) to the dual function squib 68. The dual function squib 68, under normal conditions, when a light-weight occupant is present (Type I), fires the normal firing zone 100 which initiates burning of the igniter which in turn effects combustion of the igniter material 70 passing through apertures 74 in the wall 76 thereof, located generally in the radial center of the gas generator 50. The outside of the igniter tube 72 is wrapped with aluminum foil 78 in the igniter tube 72 and the aluminum foil 78, that ruptures to allow ignition gases to exit igniter tube 72 and ignite the plurality of wafers 80. The burning wafers 80 release inflation gases which flow through the filtering pack 90 and through the inflator housing 56 into the air bag cushion 52. The pressure rise for a "normal" air bag inflation is shown in FIG. 11.

Figure 12:
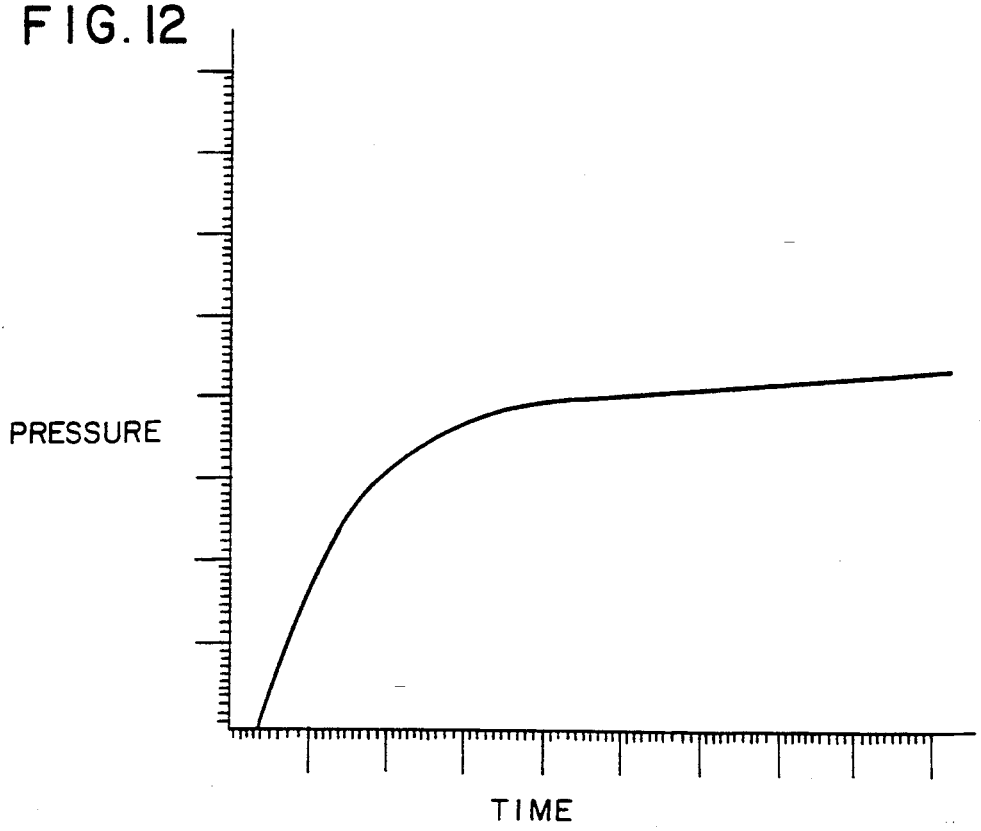

When the presence of a heavier or adult occupant is sensed (Type II) in the passenger seat by an appropriate sensor a signal would be sent to the high brisance firing zone 102 of the squib as well as the normal firing zone 100 of the squib. The output of the high brisance output zone 102 would shatter the gas generant wafers 80 thereby increasing the burn rate of the gas generant. The ignition of the gas generant would proceed as described in the preceding paragraph. The pressure rise for this "higher speed" air bag inflation is shown in FIG. 12.

Figure 13:
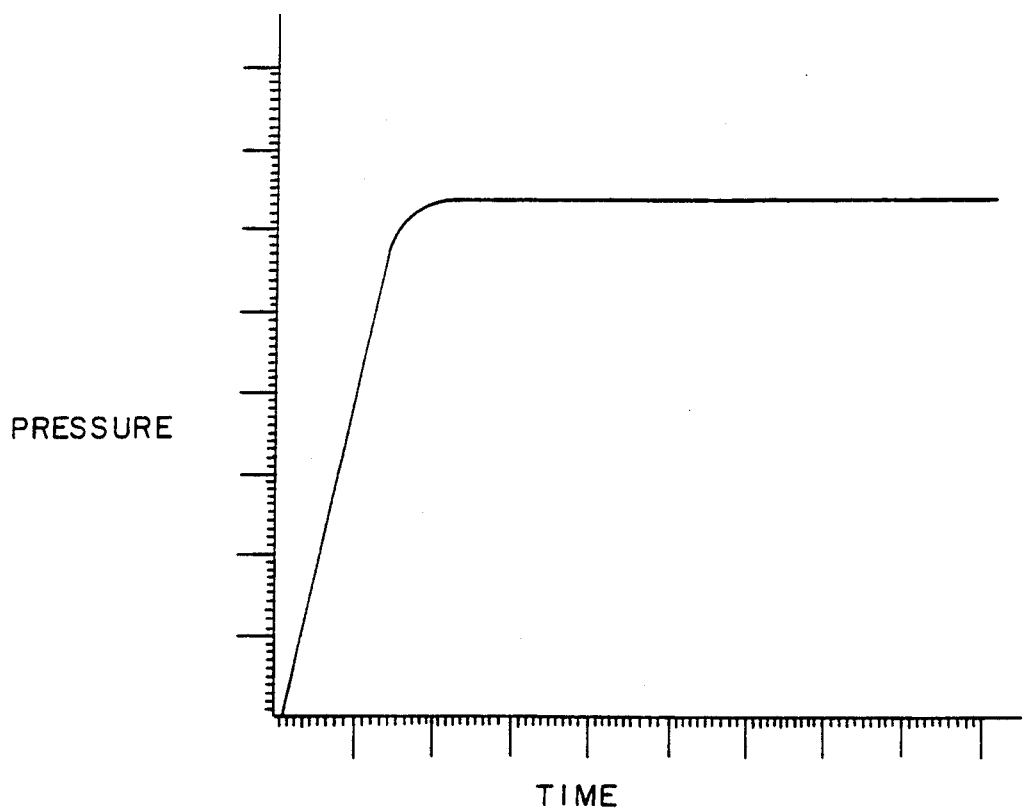

Squibs located at both ends, as shown in FIG. 4, would provide better coverage when higher speed or "severe" crash conditions (Type III) are detected. Should the crash sensor detect a higher speed (Type III) collision, a signal would be sent to the high brisant firing zone 102 squibs at both ends of the inflator. The pressure rise for the inflation of the air bag cushion under "severe" crash conditions is shown in FIG. 13.

Figure 14:
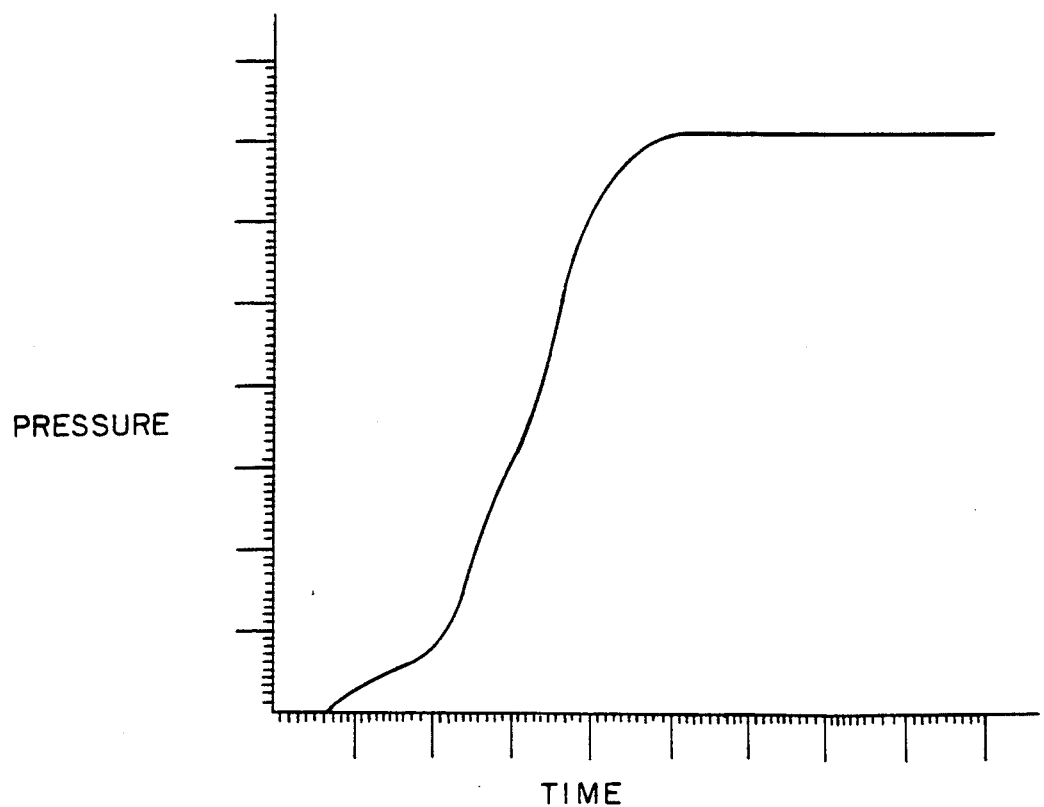

Should sensors detect "intermediate" crash conditions, crash conditions between Type I and Type II, the normal firing zone 100 would be triggered. A microprocessor or similar means would determine the suitable delay period after which the high brisance firing zone 102 or high output firing zone 106 would be triggered. For example, after an appropriate delay (5 to 10 milliseconds) the high brisance firing zone 102 would be triggered resulting in an intermediate rate of gas production. The pressure rise for the inflation of the air bag cushion under "intermediate" crash conditions is shown in FIG. 14.

Thus, in accordance with the invention, there has been provided a gas generator which produces gas at different rates depending on the output of a crash sensor which detects varying amounts of force produced by an impact between a passenger vehicle and another object. There has also been provided a gas generator which can compensate for the reduced reaction rate of a gas generating material due to below ambient temperature reactants. There has also been provided a gas generator which can provide different rates of gas production depending on the weight of an occupant. Additionally, there has been provided a gas generator which can provide gas at different rates depending on the severity of a collision.

With this description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope to the invention be determined by the scope of the appended claims.

I claim:

1. A gas generator for inflating a vehicle inflatable restraint cushion, the generator comprising:
   an elongated housing including a tubular combustion chamber having first and second end portions;
   means for closing said end portions;
   a gas generating material formed into a plurality of gas generating wafers, arranged along the length of said tubular combustion chamber and spaced from each other in a side-by-side array;
   at least one igniter means in spaced relationship from said gas generating wafers, for igniting said gas generating wafers; a radially extending plate located in spaced relation to one end of said gas generating wafers;
   at least one squib, located adjacent said radially extending plate, in spaced relationship to said at least one igniter means and which upon activation ignites said at least one igniter means; and
   aperture means in said tubular combustion chamber for directing generated gas from said tubular combustion chamber to the vehicle inflatable restraint cushion;
   wherein said at least one squib has a high output which upon activation causes said radially extending plate to impact on said gas generating wafers thereby causing said gas generating wafers to shatter, thereby increasing the surface area of said gas generating material.

2. The gas generator of claim 1 wherein said at least one squib is a dual output squib having a standard output and a high output.

3. The gas generator of claim 2 wherein said dual output squib is attached to the first end portion of said combustion chamber and a standard squib is attached to the second end portion of said combustion chamber.

4. The gas generator of claim 2 wherein a first dual output squib is attached to the first end portion of said combustion chamber and a second dual output squib is attached to the second end portion of said combustion chamber.

5. The gas generator of claim 4 wherein said combustion chamber further comprises filter means for filtering the gas.

6. The gas generator of claim 1 wherein said at least one squib is attached to the first end portion of said combustion chamber.

7. The gas generator of claim 1 wherein said combustion chamber further comprises cooling means for cooling the gas.

8. The gas generator of claim 1 wherein said gas generating wafers include fracture zones on the surface thereof whereat said gas generating wafers preferably shatter.

9. A gas generator for inflating a vehicle inflatable restraint cushion, the generator comprising:
   an elongated housing including a tubular combustion chamber having first and second end portions;
   means for closing said end portions, said tubular combustion chamber comprising;
   a gas generating material formed into a plurality of gas generating wafers, arranged along the length of said tubular combustion chamber and spaced from each other in a side-by-side array, said gas generating wafers each having a central region having a through apertures, said apertures defining inner wall surfaces;
   an igniter tube having a first end and a second end and containing at least one igniter material, said tube passing through said apertures in said gas generating wafers;
   at least one fracture means located in spaced relation to at least said first end of said igniter tube;
   at least one squib, located adjacent said at least one fracture means, in spaced relationship to said igniter tube and which upon activation initiates said igniter material; and
   aperture means in said tubular combustion chamber for directing generated gas from said tubular combustion chamber to the vehicle inflatable restraint cushion,
   wherein said at least one squib has a high output which upon activation impacts on said at least one fracture means forcing said at least one fracture means into at least said first end of said tube forcing said tube to radially expand and engage said gas generating wafer aperture inner wall surfaces causing said gas generating wafers to shatter thereby increasing the surface area of said gas generating material.

10. The gas generator of claim 9 wherein said igniter tube has fracture lines running the length thereof.

11. The gas generator of claim 9 wherein said at least one squib is a dual output squib having a standard output and a high output.

12. The gas generator of claim 9 wherein said at least one squib is attached to said first end portion of said combustion chamber.

13. A gas generator for inflating a vehicle inflatable restraint cushion, said gas generator comprising:
   a housing including a tubular combustion chamber having first and second end portions;
   means for closing said end portions;
   a gas generating material formed into a plurality of gas generating wafers, arranged along the length of said tubular combustion chamber and spaced from each other in a side-by-side array;
   wafer shatter means in spaced relationship with at least a first of said gas generating wafers;
   at least one igniter means for igniting said gas generating wafers, said at least one igniter means being in spaced relationship with said gas generating wafers;
   at least one squib, located adjacent said wafer shatter means, in spaced relationship to said at least one igniter means, said at least one squib upon activation having a high output and igniting said at least one igniter means; and
   aperture means in said tubular combustion chamber for directing generated gas from said tubular combustion chamber to the vehicle inflatable restraint cushion;
   wherein said wafer shatter means upon receipt of the high output of said at least one squib effects shattering of at least said first of said gas generating wafers thereby increasing the surface area of said gas generating material.

14. The gas generator of claim 13 wherein said at least one squib is a dual output squib having a standard output and a high output.

15. The gas generator of claim 13 wherein said at least one squib is attached to the first end portion of said combustion chamber.

16. The gas generator of claim 13 wherein said combustion chamber further comprises cooling means for cooling the gas.

17. The gas generator of claim 13 wherein said combustion chamber further comprises filter means for filtering the gas.

18. The gas generator of claim 13 wherein said wafer shatter means comprises a radially extending plate located in spaced relation to one end of said gas generating wafers and wherein upon activation of said at least one squib said output causes said plate to impact on said gas generating wafers.

19. The gas generator of claim 13 wherein:
said wafer shatter means comprises said gas generating wafers each having a central region having a through aperture, said apertures defining inner wall surfaces;
said at least one igniter means comprises an igniter tube having a first and a second end and containing igniter material, said tube passing through said apertures in said gas generating wafers;
wherein said wafer shatter means further comprises at least one fracture means located in spaced relation to at least said first end of said igniter tube; and
wherein upon activation of said at least one squib said output forces said at least one fracture means into at least said first end of said tube forcing said tube to radially expand and engage said gas generating wafer aperture inner wall surfaces.

* * * * *

UNITED STATES PATENT AND TRADEMARK OFFICE
CERTIFICATE OF CORRECTION

PATENT NO. : 5,398,966
DATED : 21 March 1995
INVENTOR(S) : Christopher Hock

It is certified that error appears in the above-indentified patent and that said Letters Patent is hereby corrected as shown below:

At column 11, line 65, "wafers preferably" should be --wafers--.

At column 6, line 43, "zone contains" should be --zone 100 contains--.

At column 7, line 50, "squib 14" should be --squib 104--.

At column 9, line 21, "zone 104" should be --zone 100--.

At column 9, line 49, "gas generate" should be --gas generant--.

At column 10, line 6, "in, a gas" should be --in a gas--.

Signed and Sealed this

Twenty-eighth Day of May, 1996

Attest:

BRUCE LEHMAN

*Attesting Officer*      *Commissioner of Patents and Trademarks*